June 16, 1925.
J. L. SCHMIDLING
FOLLOWING WORK REST
Filed Dec. 26, 1922
1,542,418
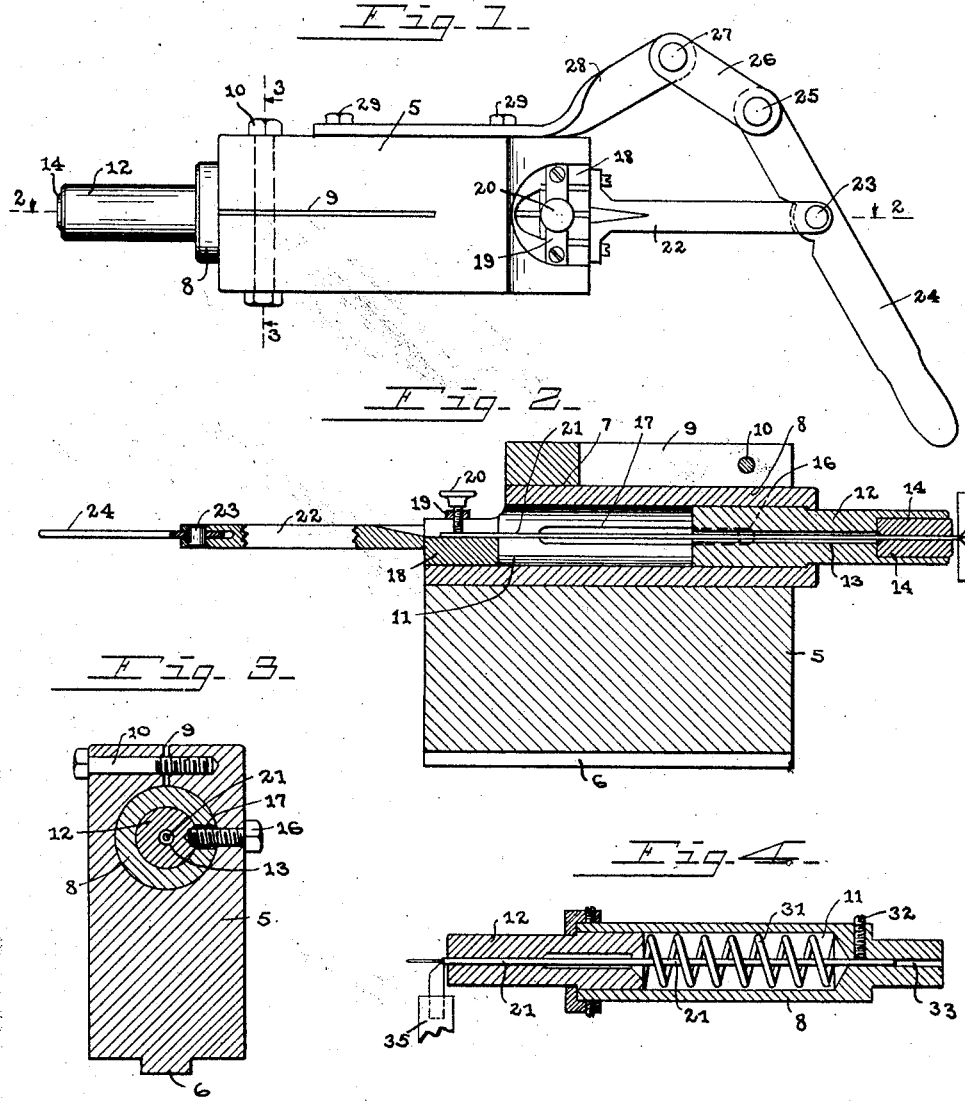
INVENTOR.
BY Joseph L. Schmidling
Morsell + Keeney.
ATTORNEYS.

Patented June 16, 1925.

1,542,418

UNITED STATES PATENT OFFICE.

JOSEPH L. SCHMIDLING, OF MILWAUKEE, WISCONSIN, ASSIGNOR OF ONE-HALF TO EDWARD SPRAGG, OF MILWAUKEE, WISCONSIN.

FOLLOWING WORK REST.

Application filed December 26, 1922. Serial No. 608,970.

*To all whom it may concern:*

Be it known that I, JOSEPH L. SCHMIDLING, a citizen of the United States, and resident of Milwaukee, in the county of Milwaukee and State of Wisconsin, have invented new and useful Improvements in Following Work Rests, of which the following is a description, reference being had to the accompanying drawings, which are a part of this specification.

This invention relates to following work rests and has for one of its objects to provide a device of this character which is particularly adapted for permitting the turning of rods or wires of relatively small diameter.

A further object of the invention is to provide a device of the character described which is adapted to be mounted upon an ordinary lathe or other similar turning machine.

A still further object of the invention is to provide a device for supporting the wire or rod immediately adjacent the porton being acted upon by the cutting tool, and for feeding the said wire or rod relative to the said supporting and cutting tool, whereby the said work may always be supported at that point.

A still further object of the invention is to provide a device which may be readily applied to or removed from machines which are already in use, and which will be simple in construction, comparatively inexpensive to manufacture and more efficient in operation than those which have been heretofore proposed.

With the above and other objects in view which will appear as the description proceeds, the invention consists in the novel details of construction and combinations of parts more fully hereinafter disclosed and particularly pointed out in the appended claims.

In the accompanying drawings in which like numerals designate like parts in all the views;

Figure 1 is a plan view of one form of device made in accordance with the present invention;

Fig. 2 is a central vertical sectional view of the parts shown in Fig. 1, taken approximately on the line 2—2 of the said Figure;

Fig. 3 is a vertical cross-sectional view taken approximately on the line 3—3 of Fig. 1; and, Fig. 4 is a fragmentary longitudinal sectional view of a somewhat modified form of the invention.

Referring more especially to Figs. 1, 2 and 3, the numeral 5 indicates a supporting block or member of any desired shape, here shown as a substantially rectangular block. The said member 5 is provided upon its lower end with a depending tongue 6, adapted to engage a groove or guideway on the lathe or other machine to which the rest may be applied, and the said member 5 is further provided with a longitudinal bore 7 in which is slidably mounted a tube or sleeve 8. The said member or block 5 is preferably provided with a saw cut or slit 9 in its upper portion above the bore 7, and a clamping bolt 10 passes through the oppositely disposed portions of the said block whereby the said sleeve or tube 8 may be rigidly clamped within the said bore in any desired position.

Slidably mounted within the bore 11 of the tube 8 is a plunger or mandrel 12, provided with a small bore 13, extending axially thereof, and the said plunger or mandrel 12 carries at its extreme end the removable wire-holding member 14, as will be clear from Fig. 2. The said mandrel 12 is adapted to be held against longitudinal movement by means of a screw or pin 16, carried by the block 5 and passing through an elongated slot 17 in the sleeve 8, into the said mandrel 12, (see Figs. 2 and 3).

Rigidly secured to the end of the sleeve 8 and opposite to the mandrel 12 is an anvil 18 provided with a bridge 19, carrying a clamping screw 20 which is adapted to clamp the wire or rod 21 in position within the bores 11 and 13, as will be clear from Fig. 2.

Secured to the said anvil member 18 is an extension rod 22 to the outer end of which is pivotally connected as at 23 the handle lever 24. One end of the said lever 24 is pivotally connected as at 25 to one end of a link 26, the other end of which is pivoted as at 27 to a supporting member 28, rigidly secured to the block 5 as by the bolts or screws 29.

In operation, when it is desired to reduce the diameter of a wire or rod, such as 21, the said wire or rod is introduced through the bores 11 and 13, through the wire-holding member 14 with its extreme end projecting a slight distance beyond the said member 14, and it is clamped in this position by means of the clamping screw 20, engaging the said wire and binding it against the anvil member 18. The clock 5, being in position upon a lathe or other turning machine and suitable secured thereto to present the extending end of the wire or rod 12 to a suitable revolving cutting tool 30, the handle member 24 is grasped and moved toward the left, as seen in Fig. 1, which motion is transmitted to the extended rod 22 and to the anvil member 18. The said anvil 18 and tube 8 will therefore be moved longitudinally of the bore 7 carrying with them the wire or rod 21 and forcing the latter to be fed through the wire-holding member 14, as will be readily apparent. As the wire is thus fed, it is acted upon by the revolving cutting member 30, whereby its diameter is reduced to any desired dimension.

During this operation the clamping bolt 10 has been loosened to permit the free movement of the sleeve 8 within the bore 7, and the mandrel 12 has been rigidly secured against axial movement by reason of its set screw connection 16 with the block 5.

When the length of wire within the device has been acted upon by the cutter member 30 the parts may be returned to their initial positions illustrated in Figs. 1 and 2 and an additional length of wire fed forward or a new piece put in.

In the form of the invention shown in Fig. 4 provision is made for the rotation of the wire and the wire-holding feeding member, as well as for the automatic return of the latter after the entire length of wire has been acted upon by the cutter which in this instance is held stationary. In other words the sleeve 8 is adapted to be fed forward by any suitable means, not shown, against the compression of a coil spring 31, which is interposed within the bore 11 of the said sleeve 8 between the mandrel 12 and the closed end of the said sleeve. The said closed end is provided with a reduced bore 33 through which the wire or rod material is fed, and in which it is clamped by means of a set screw 32. The entire device is rotated in any suitable manner and as the sleeve 8 is fed forward, it carries with it the wire or rod 21, causing it to come into contact with the stationary cutting tool 35, which will reduce its diameter to any desired dimension. The parts will be returned to their initial positions by the spring 31 when the feeding means is released.

In both forms of the invention the cutting tool is located immediately adjacent the end of the mandrel 12 so that its blade engages the wire or rod 21, very close to the wire-holding jaw 13 to the end that the said jaw may properly support the rod and prevent the bending thereof. It results from this construction that wires or rods of relatively small diameters may be produced in a lathe or other turning machine, and in actual practice wires as fine as .01 and even .005 of an inch have been produced from rods or wire of $\frac{1}{16}$ of an inch in diameter or more. It will, of course be understood that the removable wire-holding members 14 are changed to accommodate stock material of different diameters so that the said stock will just slide through the bore of the said members 14 freely, at the same time being fully supported by the said members.

While two forms of the invention have been illustrated and described it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. A device of the class described comprising a substantially rigid supporting member provided with a bore; a work feeding member slidably mounted in said bore; a work holding and supporting member carried by said first supporting member, adapted to rigidly support said work in close proximity to a cutting tool; and means for sliding said feeding member for feeding the work through said work supporting member to said tool.

2. A device of the class described comprising a substantially rigid support provided with a bore; a work holding member carried by said supporting member within said bore, adapted to hold and support the work in close proximity to a cutting tool; a hollow work feeding member slidably mounted within said bore, adapted to feed the work through said holding member to said tool; and means for sliding said feeding member.

3. A device of the class described comprising a substantially rigid support provided with a bore; a hollow work feeding member slidably mounted within said bore; a work holding member mounted within said hollow feeding member, and rigidly connected to said support; and means for sliding said feeding member relative to said support and holding member to feed work through the latter to a cutting tool.

4. A device of the class described comprising a substantially rigid support provided with a bore; a hollow work feeding member slidably mounted within said bore; clamping means carried by said feeding means for engaging the work; a work holding member mounted within said hollow feeding member, and rigidly connected to said support; and manually operable means for sliding said feeding member relative to said support and holding member to feed work through the latter to a cutting tool.

5. A device of the class described comprising a substantially rigid support provided with a bore; a tubular work feeding member provided with a slot in its wall; clamping means carried by said feeding means for engaging the work; a work holding member mounted within said tubular feeding member and extending therefrom, adapted to support the work in close proximity to a cutting tool; a rigid connection between said support and said holding member, extending through said slot; and means for sliding said feeding member in said bore to feed the work through said holding member to said tool.

In testimony whereof, I affix my signature.

JOSEPH L. SCHMIDLING.